Feb. 10, 1970  KYOSUKE TOKOTA ET AL  3,494,354

FLEXIBLE ENDOSCOPE FOR USE IN CANCER DIAGNOSIS

Filed Sept. 30, 1965

United States Patent Office 3,494,354
Patented Feb. 10, 1970

3,494,354
FLEXIBLE ENDOSCOPE FOR USE IN CANCER DIAGNOSIS
Ryosuke Yokota, Yokohama-shi, Shigehiko Fuwa, Kawasaki-shi, and Shinichi Kawashima and Yutaka Masuo, Minato-ku, Tokyo, Japan, assignors to Tokyo Shibaura Electric Co., Ltd., Kawasaki-shi, Japan, a corporation of Japan
Filed Sept. 30, 1965, Ser. No. 491,669
Claims priority, application Japan, Sept. 30, 1964, 39/55,537; June 1, 1965, 40/31,902
Int. Cl. A61b 1/06; G02b 5/14; A61m 5/06
U.S. Cl. 128—6                           3 Claims

ABSTRACT OF THE DISCLOSURE

A flexible endoscope for use in cancer diagnosis provided with means for conducting ultraviolet rays into a human body and irradiating dieased parts absorbing tetracycline. An ultraviolet rays intercepting filter in the instrument transmits only visible light rays emanating from the tetracycline of the diseased parts. Means are provided in the instrument for conducting the visible light rays outside through the filter.

---

This invention relates to an apparatus for detecting diseased parts in cancer diagnosis and more particularly to a novel apparatus for detecting the diseased parts of a patient wherein an ultraviolet ray conductor is utilized to irradiate the diseased parts of the patient with ultraviolet rays or visible light rays containing ultraviolet rays so that the nature and property of the diseased parts are determined by the presence or absence of the luminescence produced by the stimulating action of ultraviolet rays.

As a means for observing or detecting the diseased parts in the coelom of a human body, gastroscopes and the like have been proposed. In the prior detecting apparatus a photoconductor consisting of a flexible fine tube is utilized to irradiate the diseased parts of the patient with visible light rays and the appearance of the diseased part is observed by a miniature camera mounted on the extreme end of a fine tube or by directly observing the state of the diseased parts so that the prior apparatus are effective to detect the diseased parts when they have a distinct appearance but are not effective to detect such diseased parts as those having weak contrast or those of an appearance from which their nature and property are difficult to determine. For example, in the diagnosis of cancer of the stomach or other organs, detection thereof at an early stage is essential from the standpoint of effective remedy.

However, since the gastroscope and the like can examine only the surface appearance, they are not effective for correctly determining conditions that cannot be diagnosed by their appearance such as cancers of an early stage.

Accordingly, an object of this invention is to provide a novel apparatus for detecting diseased parts in cancer diagnosis wherein the diseased parts of the patient are irradiated with ultraviolet rays so that the nature of the diseased parts can be accurately determined by observing visible light rays emanating from the diseased parts.

Another object of this invention is to provide an apparatus for detecting the diseased parts in cancer diagnosis wherein the diseased part of the patient is irradiated with a mixture of ultraviolet rays and visible light rays whereby to improve the sensitivity of detection of the diseased parts.

Still another object of this invention is to provide an improved apparatus for detecting diseased parts in cancer diagnosis wherein a core of glass fibers is used in a photoconductor for transmitting light rays to irradiate the diseased parts of the patient thus decreasing attenuation of the light rays.

This invention is based on the fact that when cancerous tissue has absorbed tetracycline, and is then irradiated wi h ultraviolet rays, a characteristic and identifiable fluorescence will then be produced.

Briefly stated, the apparatus for detecting diseased parts in cancer diagnosis embodying the principle of this invention comprises a first photoconductor including a tube made of a flexible and opaque substance and glass fibers placed in said tube to transmit light rays ranging from ultraviolet rays to visible light rays, a source of light rays adapted to radiate at least ultraviolet rays into said tube at one end of said first photoconductor, a second photoconductor extending along said first photoconductor, said second photoconductor being placed in a tube made of a flexible and opaque substance, an optical system to project light rays received at the opposite end of said first photoconductor on the diseased parts of the patient, a second optical system to project visible light rays emanated from the diseased parts as a result of said irradiation upon one end of said second photoconductor and a detector of visible light rays disposed on the opposite end of said second photoconductor.

Other objects and features, the nature of the present invention and its various advantages, will appear more fully upon consideration of the specific illustrative embodiment shown in the accompanying drawings and described in detail in the following explanation of these drawings, in which.

Figure 1:
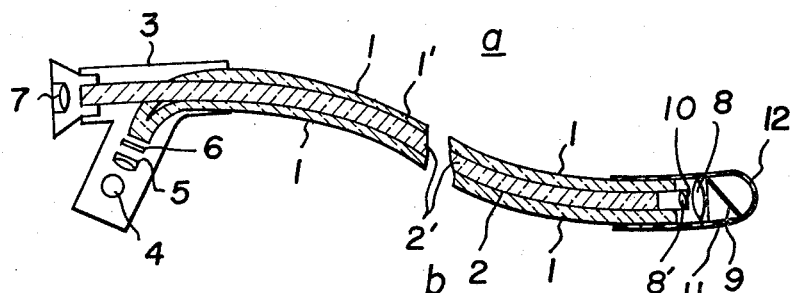
FIG. 1 is a diagrammatic sectional view of one embodiment of this invention.
Figure 2:
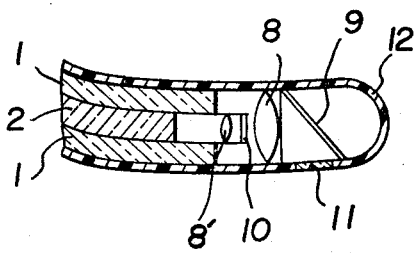
FIG. 2 is an enlarged sectional view of one type of the optical system utilized in the detecting apparatus shown in FIG. 1.

Referring now to FIG. 1 of the accompanying drawings, a first photoconductor $a$ comprises a tube 1 made of a flexible and opaque substance and a circular bundle or assemblage 1' of fine glass fibers which extends in the tube 1 to transmit light rays ranging from ultraviolet rays to visible light rays and a second photoconductor $b$ is concentrically disposed in said first photoconductor $a$, said second photoconductor comprising a tube 2 made of a flexible and opaque substance and a medium of transmitting visible light rays such as fibers of quartz glass 2' disposed in the tube 2. As shown, the first photoconductor $a$ having circular cross sections (not shown in the figure) is disposed to cover most of the length of the second photoconductor $b$ to constitute a composite photoconductor. At one end of the composite conductor the first and second photoconductors are separated to terminate in separate ends and to these ends is secured a branch type supporting member 3 not only to fixedly secure these ends, but also to form closed members. One leg of the branch type supporting member 3 contains a source 4 of a mixture of ultraviolet rays and visible light rays, for example, an ultra high pressure mercury discharge lamp, a condenser lens 5 to collect the mixed light from the source 4 to project it on one end of the first photoconductor $a$, a filter 6 to intercept visible light rays but transmit ultraviolet rays. In the other cylindrical leg of the supporting member 3 is disposed a visible light ray detector 7 such as an optical system in the form of a camera or an eyepiece opposite to one end of the second photoconductor $b$. The opposite ends of the first and second photoconductors are disposed in concentric relation and are closed by a cylindrical cap 12 hermetically sealed thereto to form a second closed member. Within the cap 12 are disposed a first optical system adapted to collect, reflect and then project onto the diseased parts outside the cap the ultraviolet rays transmitted through the first photoconductor a and radiated from said opposite end, and a second optical system adapted to collect the visible light rays emanated from the diseased parts as a result of said projection of ultraviolet rays and project the collected visible light rays on said opposite end of said second photoconductor b. If desired these two optical systems may be combined into a single system. As best shown in the enlarged longitudinal sectional view of FIG. 2, a window 11 provided through a portion of the wall of the cap 12, a lens 8 and a reflecting mirror 9 are used in common for said two optical systems. A lens 8' and a filter 10 for intercepting ultraviolet rays are disposed at the end of the tube 2 to prevent the ultraviolet rays from being transmitted through the glass fibers 2' in the tube 2. Said reflecting mirror 9 is disposed opposite to the window 11 to project the ultraviolet rays on the diseased parts and also to reflect the visible light rays from the diseased parts on the lens 8'.

It is preferable to fabricate the first photoconductor a from a bundle of composite fine fibers, each comprising a core made of optical glass of the barium base having a composition, by weight, of $SiO_2$ 52.5%, $K_2O$ 11.0%, $ZnO$ 6.1%, $BaO$ 29.0% and $Al_2O_3$ 1.4% and having a refraction index of about 1.596 at a wavelength of 365 m.µ and a superior transmitting property at said wavelength and a coating made of high purity soda lime glass having substantially the same coefficient of thermal expansion as the core and having a composition, by weight, of $SiO_2$ 68.99%, $Al_2O_3$ 3.07%, $Na_2O$ 16.24%, $CaO$ 9.17% and $MgO$ 2.55% and a refraction index of about 1.520 at a wavelength of 365 m.µ The bundle of the composite fine fibers is suitably inserted into the center tube 2 made of a flexible and opaque substance such as black rubber or a black vinyl compound to complete the first photoconductor a. The second photoconductor b comprises a bundle 2' of fine quartz glass fibers suitably placed in the tube 2 made of a flexible and opaque substance. However, it is to be understood that the second conductor b is not necessarily required to be comprised by fine glass fibers, but instead may take the form of a hollow tube containing a plurality of lenses. Also suitable resins and plastics may be substituted for the rubber or vinyl compound. Further the first and second photoconductors a and b are not necessarily required to be concentric. For example, they may be arranged in non-concentric parallel relations, it being understood that they are only required to be capable of transmitting the ultraviolet rays to the diseased parts and receiving the visible light rays emanated therefrom. In any case, it is advisable to provide a suitable filter capable of cutting off light waves having wavelengths shorter than 500 to 540 m.µ for the visible light detector in order to improve the contrast of the visible light rays.

In operation, the ultraviolet rays emanated from the radiation source 4 and collected by the lens 5 and the visible light rays contained therein are intercepted by the filter so that only the ultraviolet rays are projected on the left hand end of the first photoconductor a. The projected ultraviolet rays are transmitted through fine glass fibers 1' after repeating a number of total reflections, and are then collected by the lens 8 to be projected on the diseased part through the window 11 after being reflected by the mirror 9. If there is a substance that luminesces when stimulated by the ultraviolet rays, the visible light rays emanated therefrom will be projected on the cap 12 through the window 11. These visible light rays are then reflected by the reflecting mirror and collected by the lens 8 to pass through the ultraviolet ray filter 10 so that only the visible light rays are collected by the lens 8' and then transmitted through the second photoconductor b to the detector 7 located at the opposite end thereof. Thus, the image of the diseased parts can be photographed, viewed directly or picked up by a television image pickup apparatus.

In this manner, where the part to be examined contains a substance that luminesces when stimulated by the ultraviolet rays or where such a luminous substance is caused to be adsorbed by or adhered to said part, it is possible to readily determine the surface condition, nature and property of the diseased parts of the patient. For example, in the diagnosis of cancer of the stomach, the patient is administered an aqueous solution or brine containing a compound of the tetracycline base and then the apparatus for detecting the diseased parts constructed in accordance with this invention is inserted into the stomach whereby the state of cancer therein can be readily and accurately determined. It is well known that cancer cells selectively adsorb tetracycline and that the adsorbed tetracyline has a characteristic to emanate visible light rays (yellowish fluorescence) when stimulated by ultraviolet rays. Thus, if cancer cells are present on the wall of the stomach, then will emanate visible light rays corresponding to the distribution and the absorbed quantity of tetracycline, and such luminescence can be readily detected by the apparatus of this invention so that the apparatus is useful for the discovery, diagnosis and remedy of the cancer.

Figure 3:
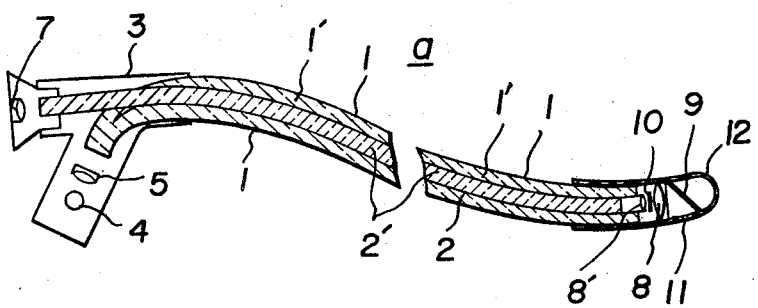
FIG. 3 is a diagrammatic longitudinal sectional view of a modified embodiment of this invention.

FIG. 3 shows a modified embodiment of this invention wherein a mixed light of ultraviolet rays and visible light rays is utilized. This embodiment differs from that shown in FIG. 1 in that the filter 6 for intercepting visible light rays has been omitted, so that visible light rays and ultraviolet rays emanated from a high pressure mercury discharge lamp are collected by a lens 5, transmitted to the opposite end through glass fibers of the first photoconductor a after a number of total reflections are repeated, and then projected upon the diseased part located outside of the cap by the optical system. The ultraviolet rays in the mixed light operate in the same manner as above described to emanate visible light rays, which, aided by the transmitted visible light rays, improves the contrast and hence the accuracy of detection.

While in the foregoing description the invention has been described with references to its application in cancer diagnosis it will be clear that this invention is not limited to this particular application but may be used to determine the nature and appearance of any material which selectively absorbs a substance that luminesces when stimulated by ultraviolet rays or to determine whether or not a material contains a substance which luminesces by the stimulation of ultraviolet rays. Accordingly the appended claims are intended to cover all modifications and embodiments of the invention which do not depart from the spirit and scope of the invention.

What is claimed is:

1. Apparatus for visually detecting diseased parts in cancer diagnosis comprising an elongated flexible opaque tube, a first photoconductor comprising an elongated bundle of fine glass fibers adapted to transmit light ranging from ultraviolet to visible rays disposed in said tube, each of said fibers comprising a core made of glass consisting of, by weight,

| | Percent |
|---|---|
| $SiO_2$ | 52.5 |
| $K_2O$ | 11.0 |
| $ZnO$ | 6.1 |
| $BaO$ | 29.0 |
| $Al_2O_3$ | 1.4 | and having a refraction index of about 1.596 at a wavelength of 365 m.µ, and a coating having approximately the same thermal expansion coefficient as said core, and a refraction index of about 1.520 at a wavelength of about 365 m.µ, a second photoconductor comprising a flexible photoconductive medium adapted to transmit visible light rays disposed in said tube parallel to said first photoconductor, a first optical system housing closing one end of said tube, a source of ultraviolet light within said housing adjacent one end of said first photoconductor, optical detector means in said housing adjacent one end of said second photoconductor, a cap closing the other end of said tube, said cap having a window in the side thereof, optical means in said cap to project ultraviolet light rays passing from said first photoconductor through said window to the diseased parts under study, ultraviolet filter means in said cap adjacent the other end of said second photoconductor adapted to pass only visible light rays therethrough to said second photoconductor and said optical detector, and means in said cap to reflect light from said diseased part to said ultraviolet filter, whereby a diseased part which has absorbed tetracycline can be detected by the characteristic visible light emitted when cancerous tissue which has absorbed tetracycline is irradiated by ultraviolet light.

2. The apparatus for detecting diseased parts according to claim 1 wherein said source of light is a source that radiates visible light rays as well as ultraviolet rays.

3. Apparatus for detecting diseased parts according to claim 1 wherein said first photoconductor is disposed about said second photoconductor in concentric relation.

References Cited

UNITED STATES PATENTS 3,357,433   12/1967   Fourestier et al. _____ 128—397

FOREIGN PATENTS 375,023   6/1962   Japan.

RICHARD A. GAUDET, Primary Examiner

K. L. HOWELL, Assistant Examiner

U.S. Cl. X.R.

106—50, 52; 128—398; 350—96